UNITED STATES PATENT OFFICE 2,317,011

β-(p-METHOXYPHENYL) n-PROPYL DIMETHYLAMINE

Eugene H. Woodruff, Kalamazoo, Mich., assignor to The Upjohn Company, Kalamazoo, Mich.

No Drawing. Application August 3, 1940, Serial No. 351,140

1 Claim. (Cl. 167—65)

This invention relates to improvements in β-(p-methoxyphenyl) n-propyl dimethylamine.

This invention relates to a new and useful product which is physiologically active as a therapeutic agent capable of producing bronchodilator effects in much higher relation to pressor effects than is the case with known substances of this general type which are used therapeutically. It has for its objects:

First, to provide a new and useful product.

Second, to provide such a product which is physiologically active as a therapeutic agent and which may be employed because of its bronchodilator effect in the treatment of disfunction of the bronchial tubes and which has significant and consistent bronchial effects of considerable duration and which is particularly desirable for use in the treatment of disfunction of the bronchial tubes because of the high ratio of bronchodilator effect to pressor effect.

Third, to provide such a substance possessing a sufficiently low toxicity to be therapeutically useful.

Fourth, to provide such a product which may be administered orally or by injection.

My product is β-(p-methoxyphenyl)-n-propyl dimethylamine. It is fully disclosed in my application filed herewith where the method of making it is also disclosed. It may be made as follows:

10 grams (0.06 mole) β-p-methoxyphenyl-n-propylamine, 15.0 grams (0.225 mole) of 40% formaldehyde, 100 cc. ethyl alcohol, and 30 grams of Raney nickel were placed in a reduction apparatus under a pressure of 45–60 lbs. hydrogen (3–4 atmospheres) and shaken until no more hydrogen was absorbed. The catalyst was filtered from the solution and the filtrate distilled in vacuo, the alcohol and formaldehyde distilling first, followed by β-(p-methoxyphenyl)-n-propyl dimethylamine boiling at 129° C./11 mm. Hg. The yield was 7.5 grams or 64% of theoretical. The melting point of the hydrochloride of this amine is 198–199° C. (corr.).

Although only 2 moles of formaldehyde are necessary, I used an excess of formaldehyde and this excess was separated as above set forth.

The bronchodilator effect is about $\frac{1}{60}$ that of epinephrine and the pressor effect is less than $\frac{1}{2400}$ that of epinephrine. The toxicity of this amine when injected intravenously into white rats is 60 mg. per kilo of body weight. The bronchodilator action is regular and prolonged.

Therapeutically this product is employed in the form of the hydrochloride or other water-soluble salts such as the sulfate or the acetate and when I refer to the product in this application, I include these salts. The product is given orally as the hydrochloride or other salt in a capsule and for intravenous injection the hydrochloride or other salt is dissolved in a sterile solution.

The terms and expressions which have been herein employed are used as terms of description and not of limitation, and there is no intention, in the use of such terms and expressions, of excluding any equivalents of the features described, or portions thereof. It is recognized that various modifications are possible within the scope of the invention claimed.

Having thus described my invention, what I claim as new and desire to secure by Letters Patent is:

A therapeutic agent for producing bronchodilator effects comprising essentially β-(p-methoxyphenyl) n-propyl dimethylamine.

EUGENE H. WOODRUFF.